(12) United States Patent
Endo

(10) Patent No.: US 6,895,519 B2
(45) Date of Patent: May 17, 2005

(54) SYSTEM LSI

(75) Inventor: Hitoshi Endo, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/251,755

(22) Filed: Sep. 23, 2002

(65) Prior Publication Data
US 2003/0163743 A1 Aug. 28, 2003

(30) Foreign Application Priority Data

Feb. 25, 2002 (JP) ........................................ 2002-047696

(51) Int. Cl.[7] .............................................. G06F 1/26
(52) U.S. Cl. ...................................... 713/322; 713/320
(58) Field of Search ................................ 713/322, 300, 713/320, 600

(56) References Cited

U.S. PATENT DOCUMENTS

| | | | | |
|---|---|---|---|---|
| 5,630,148 A | * | 5/1997 | Norris ........................ | 713/322 |
| 5,811,987 A | * | 9/1998 | Ashmore et al. ............. | 326/39 |
| 6,574,739 B1 | * | 6/2003 | Kung et al. .................. | 713/322 |

FOREIGN PATENT DOCUMENTS

| | | |
|---|---|---|
| JP | 06-119079 | 4/1994 |
| JP | 06-217049 | 8/1994 |
| JP | 09-062397 | 3/1997 |
| JP | 10-149237 | 6/1998 |
| JP | 11-073237 | 3/1999 |
| JP | 11-194849 | 7/1999 |
| JP | 2000-091976 | 3/2000 |
| JP | 2000-116887 | 4/2000 |
| JP | 2001-202155 | 7/2001 |
| JP | 2001-238190 | 8/2001 |
| JP | 2002-182776 | 6/2002 |

* cited by examiner

Primary Examiner—Jeffrey Gaffin
Assistant Examiner—Harold Kim
(74) Attorney, Agent, or Firm—Volentine Francos & Whitt, PLLC

(57) ABSTRACT

A system LSI dynamically and speedily controls clocks of various frequencies as used in a wide range of operation modes from high-speed to low-speed operation modes, enabling user selection of a system of power consumption type most suitable. The system LSI includes a ROM that stores a clock control library for carrying out clock state transitions between ordinary operation modes; and a system control circuit having a register for carrying out clock state transitions between ordinary operation modes and special modes responsive to changes in value of the register, and also carrying out clock state transitions among ordinary operation modes responsive to the clock control library. Calling of the clock control library and changing of the register value are controlled by an application program. The main library of the clock control library is described and called using C language.

11 Claims, 10 Drawing Sheets

FIG.7

| CLOCK STATE TRANSITION | | INPUT PARAMETER | JUMP TABLE NO. | LIBRARY FUNCTION NAME |
|---|---|---|---|---|
| SYSTEM w/o DRAM | LOW-SPEED > HIGH-SPEED OR HIGHEST-SPEED | 0x00 | 0x00 | clkgear0 |
| | HIGH-SPEED OR HIGHEST-SPEED > LOW-SPEED | 0x01 | 0x01 | clkgear1 |
| | NO CHANGE IN MEMORY PARAMETER | 0x02 | 0x02 | clkgear2 |
| SYSTEM w. DRAM w/o LOWEST SPEED | LOW-SPEED > HIGH-SPEED OR HIGHEST-SPEED | 0x00 | 0x10 | clkgear3 |
| | HIGH-SPEED OR HIGHEST-SPEED > LOW-SPEED | 0x01 | 0x11 | clkgear4 |
| | NO CHANGE IN MEMORY PARAMETER | 0x02 | 0x12 | clkgear5 |
| SYSTEM w. DRAM w. LOWEST SPEED | LOWEST-SPEED > LOW-SPEED, HIGH-SPEED OR HIGHEST-SPEED | 0x13 | 0x23 | clkgear6 |
| | LOW-SPEED, HIGH-SPEED OR HIGHEST-SPEED > LOWEST-SPEED | 0x14 | 0x24 | clkgear7 |
| | CLOCK CHANGE IN LOWEST-SPEED | 0x15 | 0x25 | clkgear8 |

FIG.8(a)

| STATE TRANSITION NO. \ INPUT PARAMETER | ① | ② | ③ | ④ | ⑤ | ⑥ | ⑦ | ⑧ |
|---|---|---|---|---|---|---|---|---|
| 0 | 1 | 0 | 1 | 1 | 1 | 6 | 1 | 0xff |
| 1 | 0 | 1 | 3 | 3 | 3 | 8 | 7 | 0xff |
| 2 | 1 | 0 | 0xff | 0xff | 1 | 6 | 1 | 0xff |
| 3 | 0 | 1 | 0xff | 0xff | 3 | 8 | 7 | 0xff |
| 4 | 1 | 1 | 1 | 1 | 1 | 6 | 0xff | 0xff |
| 5 | 0 | 1 | 3 | 3 | 3 | 8 | 7 | 0xff |
| 6 | 0x14 | 0 | 0 | 0 | 0 | 2 | 2 | 0xff |
| 7 | 0x13 | 1 | 1 | 1 | 1 | 6 | 0x0f | 0xff |
| 8 | 0x14 | 0 | 0 | 0 | 0 | 2 | 2 | 0xff |
| 9 | 0x13 | 0 | 3 | 3 | 1 | 6 | 1 | 0xff |
| 10 | 0 | 0 | 3 | 3 | 0xff | 0xff | 1 | 0xff |

FIG.8(b)

| | b7                                  b0 |
|---|---|
| ① | MEMORY PARAMETER CHANGE PATTERN |
| ② | CPU CLOCK MODE |
| ③ | EXTERNAL ROM MEMORY PARAMETER |
| ④ | EXTERNAL RAM MEMORY PARAMETER |
| ⑤ | EXTERNAL I/O PARAMETER |
| ⑥ | SDRAM/EDO-RAM |
| ⑦ | PCGBCNT0 SET VALUE |
| ⑧ | PCGBCNT1 SET VALUE |

SYSTEM LSI

BACKGROUND OF THE INVENTION

1. Field of the Invention

The present invention relates to a system LSI having a core CPU and, more particularly, to a system LSI capable of executing the dynamic clock control from the side of an application program.

2. Description of the Related Art

In case of battery-powered devices, for instance a mobile telephone, which belong to the application field of a microcontroller constituted by means of a system LSI, it seems that many of them are still requested to improve themselves such that their consumption of electric power (referred to simply as "power" hereinafter) is reduced as low as possible for the sake of their users' convenience and benefit, and there have been developed various techniques for responding to such request. Owing to these techniques, it has become possible to reduce the power consumption of the entire system, though gradually, by properly changing the clock speed corresponding to the need, for instance by supplying the high-speed clock when the high speed processing is necessary and supplying the low-speed clock when the wait state is needed. In the recent years, in almost all application fields, an application specific integrated circuit (ASIC) is provided for the microcontroller constituted by means of the system LSI. In the case of the system into which the ASIC is built, in order to extend the battery life, the power reduction as well as the matters related thereto are requested to be described in the specification of the system, and it becomes not rare that such low power consumption technique is incorporated into the core CPU of the system.

To begin with, a core CPU ST7 (referred to as "ST7 core" hereinafter), a product of a U.S. firm "ST Microelectronics" will be explained as an example of a conventional core CPU with reference to FIGS. 9 and 10 of the accompanying drawings. FIG. 9 is a block diagram for explaining a clock control circuit 40 of the ST7 core while FIG. 10 is an illustration for explaining the clock operation mode of the ST7 core.

As shown in FIG. 9, an oscillation portion 41 includes two oscillation terminals OSC1 and OSC2 and is connected with an oscillator such as a quartz oscillator through these oscillation terminals, thereby generating clock signals. A clock correction portion 42 is made up of a clock filter 43 and a clock rearrangement portion 44. The clock filters 43 removes the clock in which a spike noise or the like is mixed, and rearranges the clock in a predetermined wave forms. If the clocks are sparsely lined as a result of the above rearrangement of wave form thereof, the rearrangement portion 44 operates to narrow the frequency bandwidth of the clock.

A main clock control circuit 45 is made up of a setting register 46 and a clock frequency dividing portion 47. The setting register 46 sets the frequency division ratio of the clock to be 1/4, 1/8, 1/16, and 1/32. The frequency divided clocks fcpu are supplied to the ST7 core and peripheral devices, and are outputted from the I/O terminal CLKOUT to the external portion through an I/O switching portion 48.

The ST7 core is operable in four kinds of clock operation modes as shown in FIG. 10, under the control of the above clock control circuit 40. To put it more concretely, the ST7 core operates at the frequency of 1/2 of the oscillation frequency in the high-speed operation mode. In the low-speed operation mode, it operates at the frequency of 1/4, 1/8, 1/16, and 1/32 of the oscillation frequency, respectively. In the wait mode, the clock of the CPU is halted while peripheral devices are in operation. In the halt mode, the oscillation per se halts so that the power consumption of the ST7 core is then minimized. Like this, if each operation mode is selectively used in correspondence with the processing by the CPU, a considerable amount of the power consumption can be saved in total.

On one hand, in case of constituting a microcontroller by means of the system LSI, there are some cases where the low power consumption technique is incorporated in the core CPU. An ARM920T (referred to as ARM core hereinafter), a product of a British firm "ARM", may be a good example of such core CPU. In case of the ARM core, it is premised that a power management portion is formed on the side of the system LSI.

There are two reasons why the ARM core adopts the constitution like the above. The first reason is that if the clock control mechanism is built in the core CPU side, a certain restriction is given to the design of the system LSI, as a result of which the core CPU would come to lose versatility thereof. On the side of the system LSI using the core CPU, there might take place a case where the clock drops its speed down and halts, eventually. In such case, it would become necessary to detect and examine such state and to adjust the timing of the internal memory, the internal timer, and so forth.

The second reason is as follows. The ARM core is provided with a joint test action group (JTAG) interface test terminal, and transmits the internal state of the core CPU to the external portion through an in-circuit emulator (ICE), and operates the debugger, thereby giving convenience to the development of the application program. Consequently, the clock change on the core CPU side results in restriction of such use of the test terminal. Therefore, in order to effectively carry out the power management free from such restriction as mentioned above, it is preferable for them to provide the power management portion not on the side of the core CPU but on the side of the system LSI, thereby achieving the total power management.

In recent years, the system LSI has been sophisticated more and more and it becomes so difficult for the core CPU to directly and quickly respond to various demands coming from ASIC only by the core CPU itself. Then, in order to comply with the above problem, it would be considered to provide a versatile microcontroller mounting the same core CPU thereon. In other words, it is the thought of collecting common elements which are usually used by the system LSI, for instance, peripheral devices of the CPU, memory architectures and so forth, and have the basic function of executing an operating system (OS) at real time, and of presenting a versatile microcontroller provided with the elements and function as described above.

In order to achieve a total power management by mean of a versatile microcontroller like this, it is necessary for the versatile power management to be carried out taking account of not only the core CPU but also the inherent function of the application.

In the power management by the prior art microcontroller, however, the clock is just simply changed similar to the case of the ST7 core as mentioned above. In case of the ST7 core, as shown in FIG. 10, there are just simply changed the four operation modes which are the high-speed operation mode, the low-speed operation mode, the wait mode and the halt mode. However, when the power management portion is provided not on the side of the core CPU but on the side of the system LSI, it is demanded that the clock of the core CPU and that of the system LSI have to be separately controlled. Consequently, it is not possible to carry out a fine control by means of the simple model like this.

Furthermore, it has been tried to dynamically control the clock from the application program side. For instance, in case of the ST7 core, the circuit related to the clock control is controlled by means of an assembler language which can be directly controlled. However, the clock control by using the assembler language is apt to receive many restrictions from the point of view of the application program development. Accordingly, it is preferable, if possible, to provide a flexible interface constituted by using the high-level program language like the C language that is usually adopted in the current software development. Unfortunately, however, there has been no support allowing a real power management by using the programming language like this.

SUMMARY OF THE INVENTION

The present invention has been made in consideration of various problems the prior art system LSI has encountered so far, and an object of the invention is to provide a novel and improved system LSI wherein the power consumption of it can be suitably reduced by dynamically and speedily controlling the clock having various frequencies as used in a wide mode range from the high-speed operation mode to the low-speed operation mode and, in addition, a real power management is executed from the side of an application program by using such a programming language as usually and widely adopted in the software development, thereby enabling the user to select the low power consumption system most suitable for his own system.

In order to solve the problems as mentioned above, according to the first aspect of the invention, there is provided a system LSI having a plurality of ordinary operation modes and a plurality of special modes in response to the clock state supplied to a central processing unit. The system LSI includes: the first memory means (551) storing a clock control library for controlling the clock state transition between the ordinary operation modes; a system control circuit (534) having a register and carrying out the clock state transition between the ordinary operation mode and the special mode in response to the change of the value of the register, and also carrying out the clock state transition among the ordinary operation modes in response to the clock control library; a clock generation circuit (558) receiving a plurality of standard clocks and generating the clock supplied to the central processing unit according to the control of the system control circuit; and the second memory means (551) storing an application program (31); wherein call of the clock control library and change of the register value are controlled by the application program.

The first memory means storing the clock control library and the second memory means storing the application program may be constituted as two independent memory means which are separated from each other. The first memory means and the second memory means may be formed to coexist in a single memory means, sharing the memory area of the above single memory means.

The prior art system has used a single standard clock system and realized only the high-speed operation mode and the low-speed operation mode by executing the frequency division of the above standard clock. On this point, different from the above prior art system LSI, the present invention adopts a plurality of standard clock systems. Accordingly, the clock generation circuit (558) is made up of a PLL (573) which receives a plurality of standard clocks (MCLK0, MCLK1, MCLK2) and generates, if need be, the clock obtained by multiplying the standard clocks, and a frequency division/selection portion (574) which divides the frequency of the standard clock or the multiplied standard clock, or selects the same. With this, it becomes possible to construct the system LSI having a variety of ordinary operation modes (highest-speed operation mode, high-speed operation mode, low-speed operation mode, lowest-speed operation mode, and so on).

Furthermore, when expressing the relation between the current clock state and the clock state after transition by using a function (clkgear) in the form of the clock control library, it becomes possible to dynamically and speedily control a plurality of clocks in the ordinary operation mode, as if it were a gear-change operation. In this way, the clock state can be controlled more finely.

Still further, according to the invention, the system control circuit includes a register, and the control making the ordinary operation mode transit to the special mode is carried out by changing the value of this register. At this time, as the register setting is kept unchanged after completion of transition to the special mode, the reverse transition from the special mode to the ordinary operation mode can be carried out by just releasing the special mode with the help of the external interruption, thus, the transition control being made much easier.

It is preferable that the clock control library is made up of a plurality of libraries and a main library, the former controlling the system control circuit and the clock generation circuit as well to transit the clock state supplied to the central processing unit and the latter being called by the application program and selecting any one of the libraries in correspondence with the clock state supplied to the central processing unit.

As described above, the clock control library is made up of the main library and a plurality of libraries. With execution of the function (clkgear) corresponding to the library as selected by the main library, it becomes possible to dynamically control the circuits associated with the clock control, that is, the clock generation circuit and the system control circuit.

It is preferable for the main library to be described in the same programming language as the application program.

The main library and the application program are described in the same programming language and the application calls the main library by using the above same language. With this, it becomes possible to realize a flexible interface enabling the user to handle it with ease and also enabling the user to select the power management system which is the most suitable to his system. At present, with regard to the above-mentioned language, the invention assumes the C language, which is a high-level language and, now a day, is widely adopted in the development of the software. Even though a certain higher-level language would come out in future, it is needless to say that the descriptive language of the library could be suitably altered without causing any change in the essential constitution of the invention.

Furthermore, it is preferable for each library to be described in a programming language which is able to directly control the clock generation circuit and the system control circuit as well.

With use of such language, the hardware in association with the clock control, that is, the clock generation circuit and the system control circuit can be directly controlled by the library. As an example of such language, the invention supposes the assembler language for the time being.

The special mode includes the first special mode (Halt Mode) which halts the clock supply to the principal constituents of the central processing unit, the second special mode (Stop Mode) which stops the clock of the entire central processing unit, and the third special mode (Sleep Mode) which puts the power source of the entire central processing unit into the sleeping state.

With provision of the above-mentioned three modes, it becomes possible to establish the constitution which can freely manages the reduction of the power consumption It is preferable for the system control circuit to be provided with the frequency division ratio setting register (563) for setting the frequency division ratio of the clock in the clock generation circuit, the clock halt registers (564, 565) which receive the clock signal from the clock generation circuit to carry out the setting for stopping or supplying the individual clock signal, and the status register (567) for judging the status of the central processing unit immediately after being released from the third special mode. The above three registers, that is, the frequency setting register, the clock halt register, and the status register may be constituted by separately using a single register or by complexly using two or more registers. The design of the bit length and the meaning of each bit may be suitably changed to meet the specification of the system.

With provision of the clock halt register as the register of the system control circuit, it becomes possible to control the transition of the clock state to the first special mode (Halt Mode) which halts the clock supply to the principal constituents of the central processing unit, and also the transition to the second special mode (Stop Mode) which stops the clock of the entire central processing unit. Furthermore, with the provision of the status register, it becomes possible to control the transition of the clock state to the third special mode (Sleep Mode) which puts the power source of the entire central processing unit into the sleeping state.

It is preferable for one of the standard clocks to use the frequency of 32.768 kHz.

The quartz oscillator for use in a wristwatch may be used for obtaining the frequency of 32.768 kHz. With use of the clock of which the frequency is very low compared to the ordinary operation mode which is operated at the frequency of several tens of MHz through several hundreds, it becomes possible to realize the substantial wait mode.

BRIEF DESCRIPTION OF THE DRAWINGS

Certain embodiments of the system LSI according to the invention will now be described in detail by way of examples and with reference to the accompanying drawings, wherein parts having substantially like function and constitution in each of several figures are identified by the like reference numeral or character, and wherein:

FIG. 7 is a table for explaining call of the clock control library, FIG. 8 is a table for explaining parameters possessed by the library, wherein (a) indicates input parameters to the library and (b) indicates the contents of the input parameters.

DETAILED DESCRIPTION OF THE PREFERRED EMBODIMENTS (CPU 510)

Figure 1:
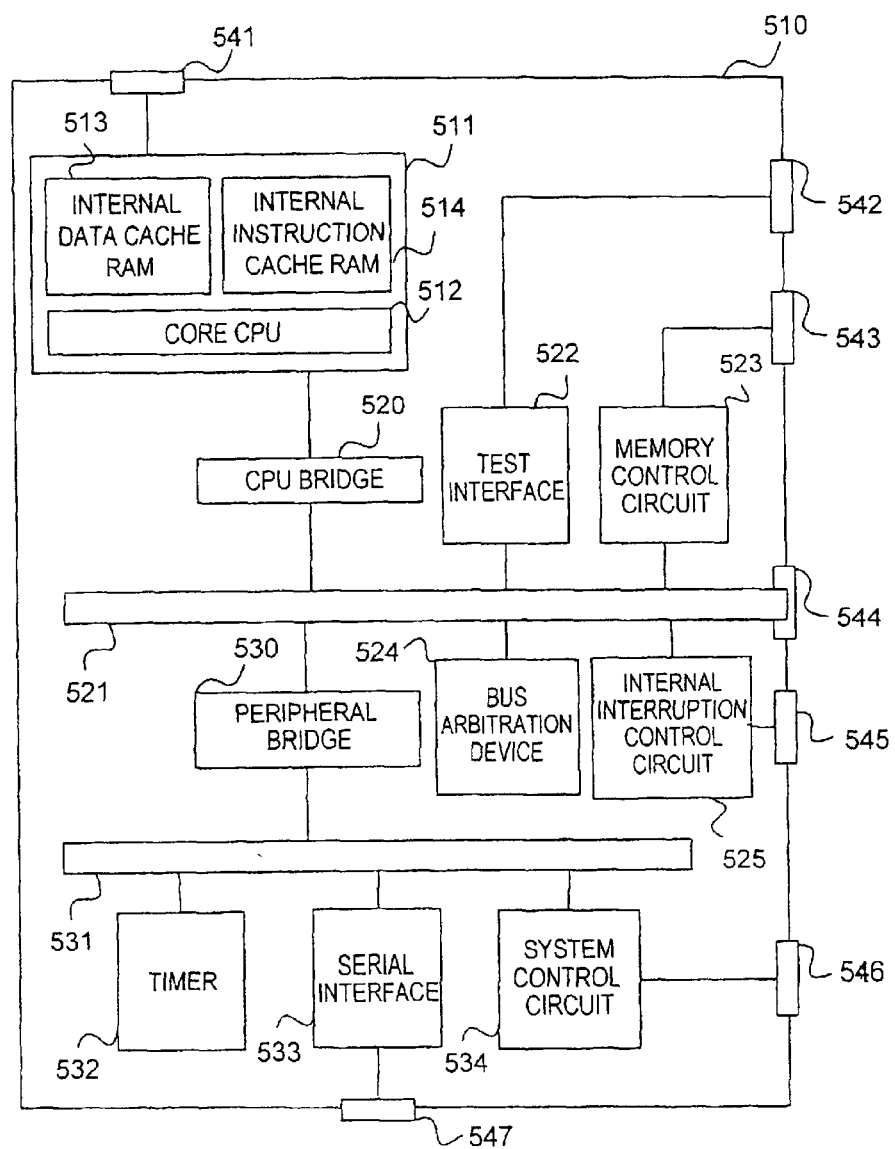
FIG. 1 is a block diagram for explaining the constitution of a CPU.

Referring to FIG. 1, a CPU 510 includes a processor 511 in its inside. A CPU bridge 520 is between the processor 511 and a dedicated high-speed bus 521 and connected with both of them, respectively. On one hand, a peripheral bridge 530 is between the dedicated high-speed bus 521 and a dedicated peripheral bus 531 and connected with both of them, respectively. The processor 511 includes a core CPU 512 as a main constituent thereof and further includes an internal data cache RAM 513 and an internal instruction cache RAM 514 as well.

A system control circuit 534 is connected with the peripheral bridge 530 and is able to receive an external clock from an external circuit through an external clock terminal 546. This system control circuit 534 has the function of supplying the clock to the processor 511 and the other constituents of the CPU 510 and also has the function of controlling them.

All of a test interface 522 connected to the dedicated high-speed bus 521, a memory control circuit 523, a bus arbitration device 524 and an interruption control circuit 525 belongs to the other constituents of the CPU 510. The test interface 522 is connected with an external test bus 542, the memory control circuit 523 is connected with an external memory bus 543, and the interruption control circuit 525 is connected with an interruption signal terminal 545. The dedicated high-speed bus 521 is provided with an external terminal 544, and the system LSI can be constituted by connecting a user device with this external terminal 544.

In addition to the system control circuit 534, a timer 532 and a serial interface 533 having a communication port 547 are also connected with a dedicated peripheral bus 531.

A JTAG terminal 541 is used as a test interface of the processor 511 itself.

(System LSI 550)

Figure 2:
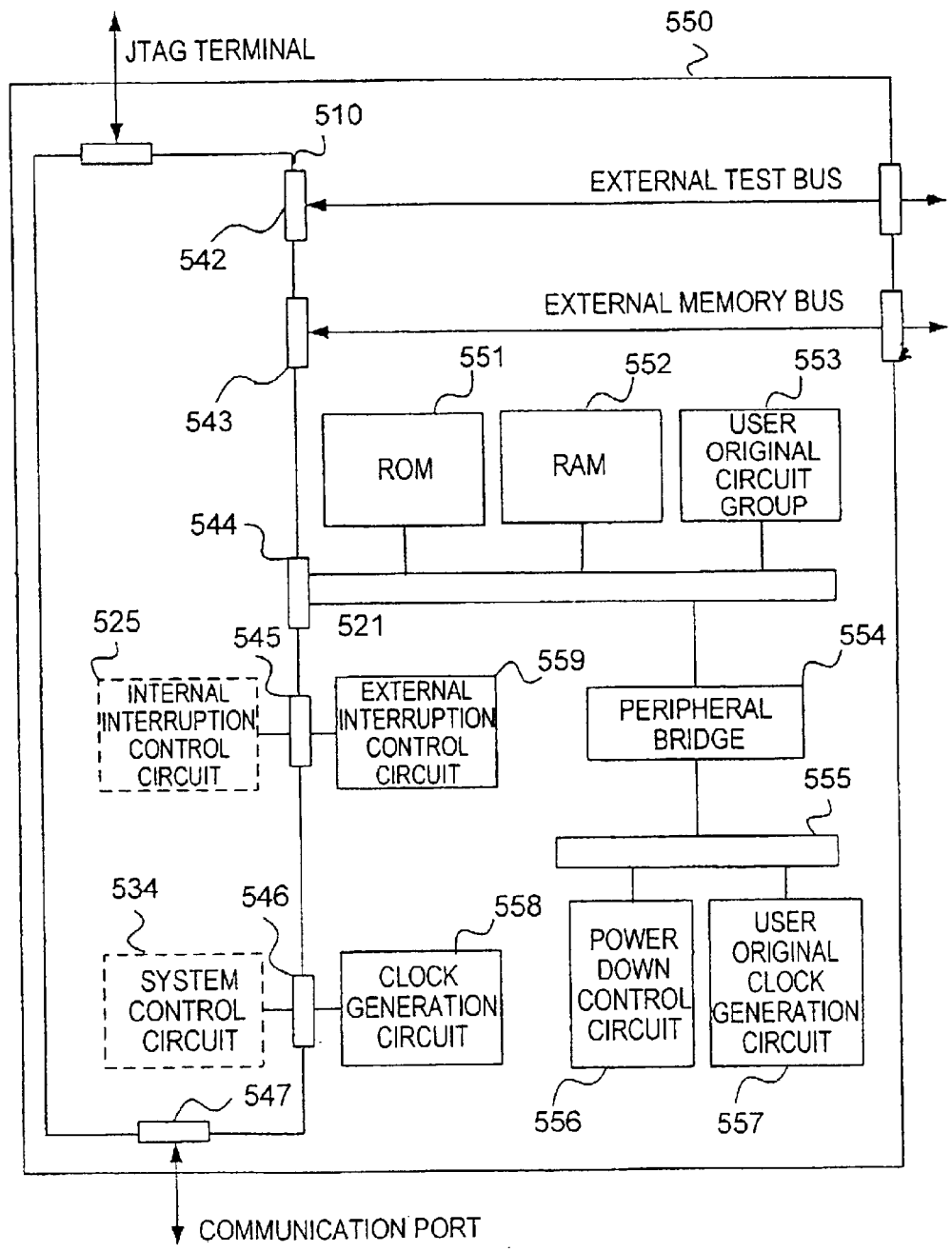
FIG. 2 is a block diagram for explaining the constitution of a system LSI using the CPU as shown in FIG. 1.

Referring to FIG. 2, a system LSI 550 includes the CPU 510 shown in FIG. 1 as a principal constituent thereof and a dedicated high-speed bus 521 extended from the external terminal 544. The extended dedicated high-speed bus 521 is connected with a read only memory (ROM) 551 storing a clock control library and an application program which will be described later, a random access memory (RAM) 552, and a user original circuit group 553.

Furthermore, a peripheral bridge 554 connected with the dedicated high-speed bus 521 is connected with a power down control circuit 556 and a user original clock generation circuit 557, both of which are on a dedicated peripheral bus 555. The power down control circuit 556 realizes the power down by controlling the clock distribution over the entire system LSI.

The external clock terminal 546 is connected with a clock generation circuit placed on the system LSI 550 and supplies the external clock to a system control circuit 534. In addition, an external interruption control circuit 559 is provided to be connected with the interruption signal terminal 545. The embodiment of the invention as mentioned above is characterized by a system control circuit 534 and a clock generation circuit 558. These two circuits 534 and 558 will be explained in the following, with reference to FIGS. 3 and 4, respectively.

(System Control Circuit 534)

Figure 3:
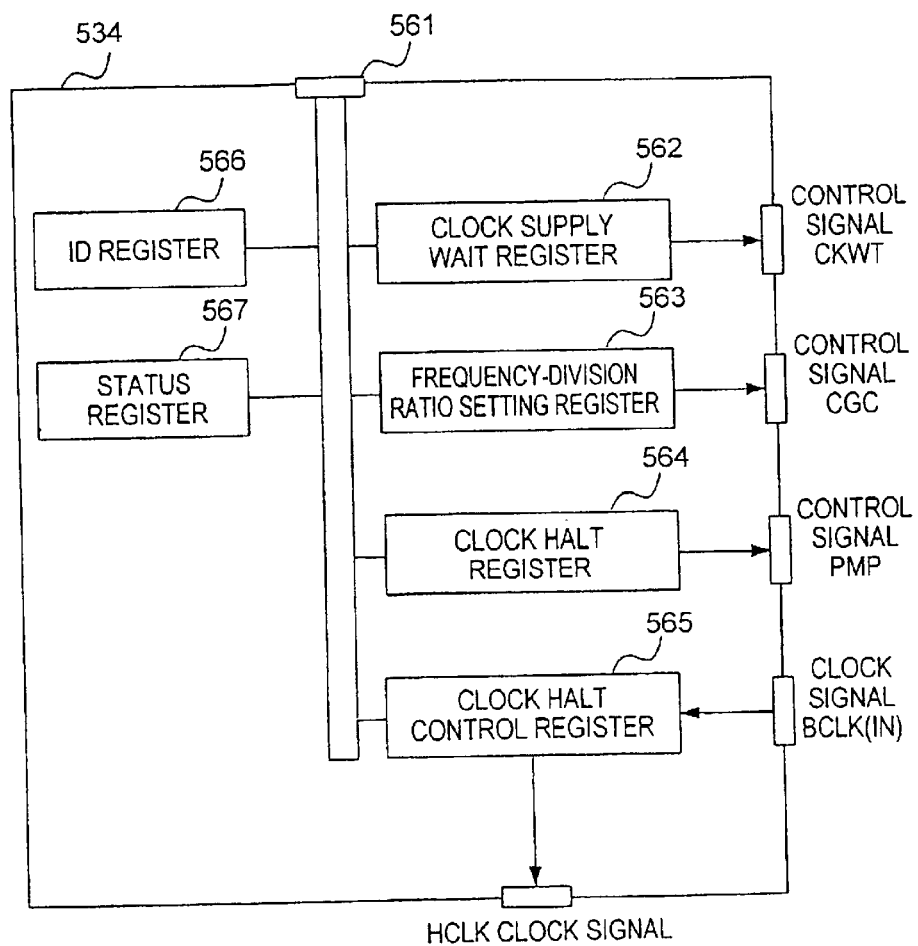
FIG. 3 is a block diagram for explaining a system control circuit.

Referring to FIG. 3, the system control circuit 534 has the function of supplying the clock to the processor 511 and other constituents of the CPU 510 and controlling those. A dedicated peripheral bus 561 is connected with a various sorts of registers, by which the clock supplied to the CPU 510 is controlled. Each of these registers will be explained in the following.

A clock supply wait register 562 is a register having the function of setting up the start time of the oscillation of a reference clock and ensuring a stabilized period of time during which a phase-locked loop (PLL) 573 reaches its locked state. This register 562 outputs a control signal CKWT.

A frequency-division ratio setting register 563 is a register for controlling the clock generation circuit 558. This register 563 determines a clock frequency-division ratio and outputs the control signal CGC.

A clock halt register 564 is the register that designates two clock operation modes of the CPU 510, that is, a halt mode (the first special mode) halting the clock supply to the principal constituents of the CPU 510, and a stop mode (the second special mode) stopping the clock all over the entirety of the CPU 510. This register 564 outputs a control signal PMP. Designation of the operation mode and which constituent of the CPU 510 is to be given a halt command on the clock supply, are decided by setting a specific bit of the register.

A clock halt control register 565 is a register which outputs a clock signal HCLK according to the instruction from the clock halt register 564. A clock signal BCLK (IN) causing the above instruction is supplied from a clock generation circuit 558 which will be described later.

An ID register 566 is a register for reading out a system ID which identifies a sort of the CPU 510 and so on.

A status register 567 is a register for indicating the status of respective peripheral devices. This status register 567 notifies the handshaking state in the inside peripheral devices of the CPU 510, immediately after being released from the Sleeping mode (the third special mode), which is one of the clock operation modes of the CPU 510 and halts the entire power source of the CPU 510. The notice of the handshaking state is executed by setting a specific bit of the register.

Each value of registers 562 through 567 is directly designated by the processor 511 through the dedicated peripheral bus 561.

Having explained in detail the constitution and function of the system control circuit 534 in the above, we now move to the clock generation circuit 558.

(Clock Generation Circuit 558)

Figure 4:
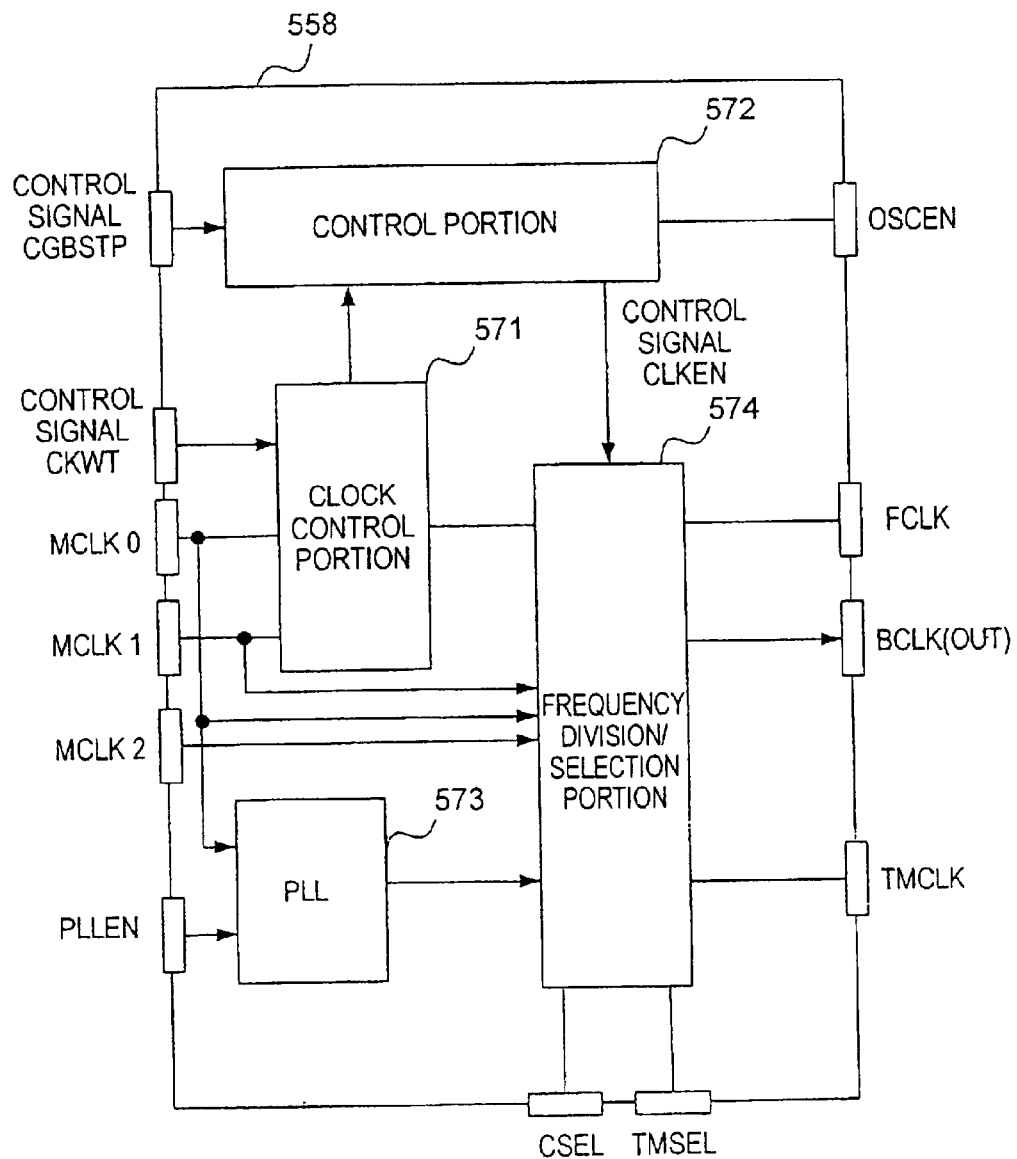
FIG. 4 is a block diagram for explaining a clock generation circuit.

Referring to FIG. 4, the clock generation circuit 558 supplies the external clock to the system control circuit 534. The output of each quartz oscillator is inputted to each of terminals MCLK0 (62.5 MHz), MCLK1 (50 MHz), and MCLK2 (32.768 KHz), of which each constitutes a base oscillation of various clocks supplied to the system.

A clock control portion 571 controls various sorts of clocks. A control signal CKWT inputted to the clock control portion 571 is an input signal from the clock supply wait register 562 of the system control circuit 534 and is used for ensuring the stabilized period of time of the PLL 573.

A control portion 572 controls the entirety of the clock generation circuit 558. The control signal CGBSTP inputted to the control portion 572 is a signal which halts the clock of the clock generation circuit 558 itself. In the sleep mode which will be described later, halt of oscillation is instructed by an output signal OSCEN. Moreover, the control portion 572 outputs a signal CLKEN controlling the supply/halt of the clock to a frequency-division/selection portion 574.

The PLL 573 generates the stabilized high frequency clock (48 through 240 MHz) in synchronization with the clock MCLK0 as supplied. Thus, it is possible to select four clock systems in total if combined with the above various sorts of clocks. The PLL 573 can be halted with a control signal PLLEN.

All the clocks are divided into frequencies and selected in the frequency division/selection portion 574, of which the principal output signals are a clock FCLK of the core CPU 512, a clock BCLK (OUT) as used for access from the dedicated peripheral bus 521, and a timer clock TMCLK. Control signals used in the frequency division/selection portion are the operation clock FCLK, a control signal CSEL over the clock BCLK (OUT) as used for access from the dedicated peripheral bus 521, and a control signal TMSEL over the timer clock TMCLK.

As described before, the further object of the invention is to most suitably reduce the power consumption of the system LSI by dynamically and speedily control a lot of various frequencies as used in various modes from the high-speed operation mode to the low-speed operation mode. As shown in FIG. 2, the system LSI 550 is made up of the CPU 510 using the processor 511 and the user original circuit group 553. Therefore, the clock supplied to the processor 511 has to be able to respond to the request of the processor 511.

The processor 511 as used in the current embodiment has two operation modes, one being a fast bus mode and the other being a synchronous mode. The fast bus mode is an operation mode wherein the clock BCLK as used for access from the dedicated peripheral bus 521 is used by both of the processor 511 and the dedicated peripheral bus 521. The synchronous mode is an operation mode wherein the operation clock FCLK of the core CPU 512 is used in the processor 511 while the clock BCLK for access use is used in the dedicated peripheral bus 521.

The clock BCLK for access use of the dedicated peripheral bus 521 is processed by means of the frequency division/selection portion 574 as shown in FIG. 4 to have a frequency equal to or 1/2 of the clock FCLK for use in the core CPU. The switchover of these modes is carried out by setting the register of the core CPU 512.

In case of the CPU 510, the clock FCLK for use in the core CPU and others could be set in detail in the register group inside the system control circuit 534 as shown in FIG. 3. The function capable of dynamically and speedily controlling the clock group like this will be called "Clock Gear" hereinafter in the present specification. In the following description on the current embodiment, however, it is assumed that the clock gear control is possible only in the fast bus mode.

Figure 5:
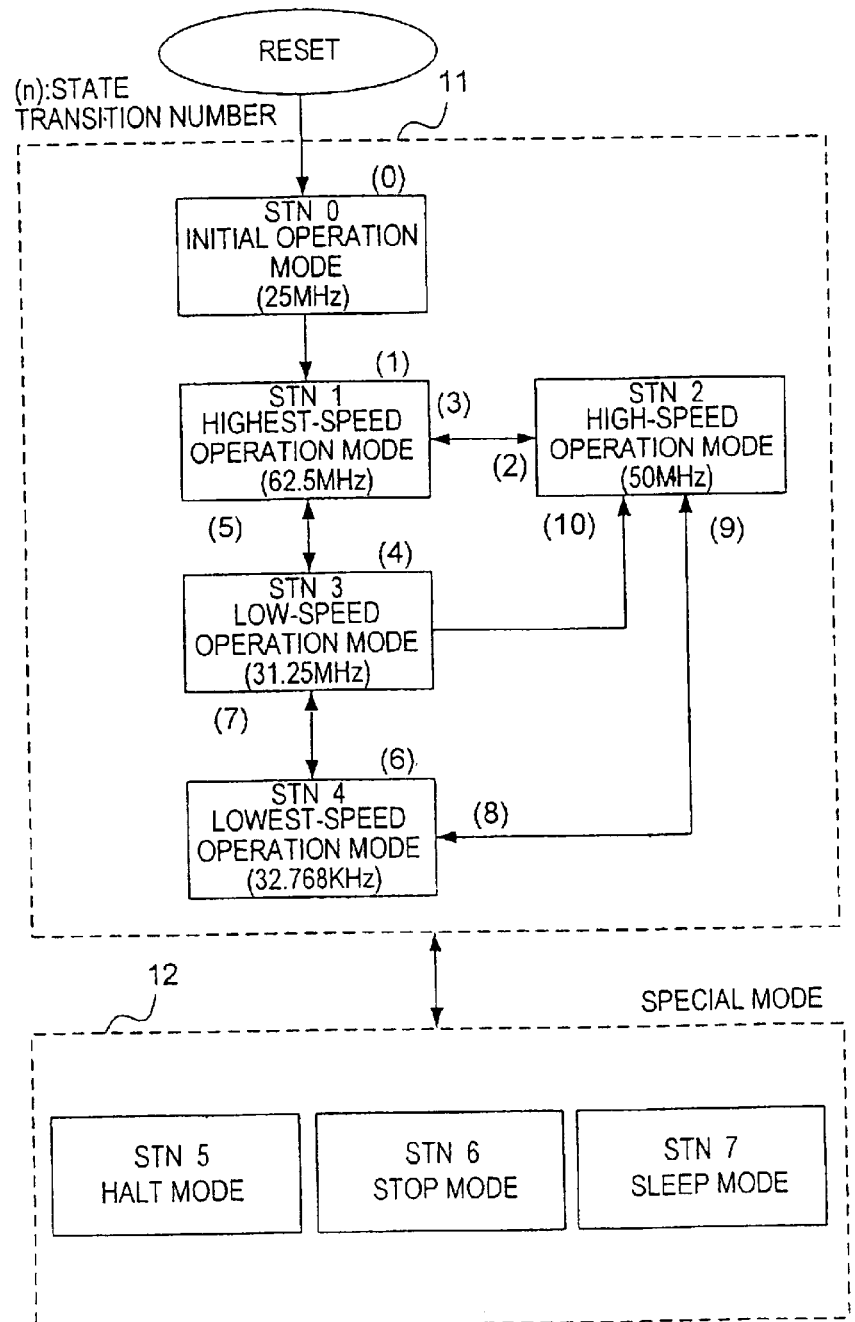
FIG. 5 is a block diagram showing an example of clock operation mode and the state transition thereof.

FIG. 5 shows, by way of an example, some clock operation modes which can be taken according to the current embodiment, more particularly, those which can be taken by such a circuit constitution having a dynamic random access memory (DRAM) inside the system LSI and allowing the lowest-speed operation mode to exist. Transition between these modes is carried out by means of the above-mentioned clock gear, which is described in detail in the following.

As shown in FIG. 5, the embodiment provides eight operation modes STNn (n: integer of 0 through 7). Five operation modes STN0 through STN4 belong to an ordinary operation mode 11 while remaining three operation modes STN5 through STN7 belong to a special mode 12.

In the ordinary operation mode 11, there are an initial operation mode STN0, a highest-speed operation mode STN1, a high-speed operation mode STN2, a low-speed operation mode STN3, and a lowest-speed operation mode STN4, of which the last four (i.e. STN1 to STN4) are responsive to the operation speed of the CPU 510.

Furthermore, in the special mode 12, there are included a halt mode STN5 halting the clock supply to the principal constituents of the CPU 510, a stop mode STN6 stopping all the clocks of the CPU 510, and a sleep mode STN7 halting all the power sources of the CPU 510. In FIG. 5, several frequencies as written in the ordinary operation mode 11 indicate those of the clock BCLK as used for access from the dedicated peripheral bus 521.

The base oscillation of the clock (including an overtone) has three frequencies of 62.5 MHz, 50 MHz, and 32.768 KHz, which correspond to terminals MCLK0, MCLK1, and MCLK2 as shown in FIG. 4, respectively. The frequency of 32.768 KHz is generated by using the quartz oscillator for use in a wristwatch. The output of the PLL 573 is synchronized with the base oscillation MCLK0 and is multiplied up to the maximum of 240 MHz. Therefore, in the system LSI 550, it becomes possible to select the clock including those which are multiplied by the PLL 573 from the four clock systems in total.

In FIG. 5, the above-mentioned frequencies 62.5 MHz, 50 MHz, and 32.768 KHz, or a half of the first two i.e. 31.25 MHz and 25 MHz is shown as the clock BCLK for access use. In this case, however, an upper limit is determined with regard to the operation clock FCLK of the core CPU 12 depending on a specification. Also, there is limited the maximum frequency at which the clock BCLK for access use is allowed to be used.

In the following, five ordinary operation modes and three special modes will be explained with reference to FIG. 5. The ordinary operation mode will be first explained.

(STN0: Initial Operation Mode, 25 MHz)

The initial operation mode is used for setting initial values and so on immediately after being reset. As it is difficult for some of I/O devices connected with the dedicated high-speed bus 521, the dedicated peripheral bus 531 and so forth to make a high-speed response, the initial setting is carried out in the initial operation mode by means of the low-speed clock. Immediately after being reset, the core CPU 512 is in the fast mode.

(STN1: Highest-Speed Operation Mode, 62.5 MHz)

The highest-speed mode is the mode for operating the dedicated high-speed bus 521 and the dedicated peripheral bus 531 at high-speed. Consequently, the power consumption by the entire system becomes large.

(STN2: High-Speed Operation Mode, 50 MHz)

The clock speed in high-speed operation mode is slower than that in the highest-speed operation mode (STN1), but the application can be operated at a sufficient speed in this operation mode. The reason why the mode like this is separately provided is for smoothly executing the clock gear, thereby optimizing reduction of the power consumption by the entire system.

(STN3: Low-speed Operation Mode, 31.25 MHz)

The low-speed operation mode is the mode which substantially reduces the power consumption by the entire system. If operating a low-speed device like a key board, this mode functions sufficiently.

(STN4: Lowest-Speed Operation Mode, 32.768 KHz)

The lowest-speed operation mode substantially realizes the wait mode of the system and reduces the power consumption of the entire system to a great extent. In this case, however, as the clock supply to the system is not completely halted, this operation mode can quickly transit to the above-mentioned low-speed operation mode and others.

The memory control circuit 523 as shown in FIG. 1 controls the external DRAM and others by means of an external memory bus 543. At this time, the above-mentioned base frequency 32.768 KHz is used as a clock for refreshing the DRAM. As this is depending on the standard of the DRAM, if taking a frequency lower than the above frequency in the lowest-speed operation mode (STN4), the memory control circuit 523 controlling the DRAM has to be operated in the self-refresh mode.

Five ordinary operation modes according to the invention have been explained in the above. Now, we move to the explanation of special modes.

(STN5: Halt Mode (First Special Mode))

The halt mode is the mode for halting the clock supply to principal constituents of the CPU 510 as shown in FIG. 1, that is, the processor 511, the CPU bridge 520, the peripheral bridge 530, the bus arbitration device 524, and so forth. Transition to the halt mode is executed, from the application side, by setting HALT of the clock halt register 564 in the system control circuit 534 as shown in FIG. 3. With this, the operation of almost all devices operated with high-speed clocks is halted, so that the power consumption by the entire system can be reduced to a great extent. However, peripheral devices are still in operation even under this condition. For instance, as the interruption control circuit 525 is still in operation, it can accept the external interruption, thus being able to reopen the clock supply by a means other than resetting it.

(STN6: Stop Mode (Second Special Mode))

The stop mode is the mode for stopping the clocks of the entire CPU 510. Transition to the stop mode is executed, from the application side, by setting STOP of the clock halt register 564 in the system control circuit 534 as shown in FIG. 3. The control signal CGBSTP as shown in FIG. 4 instructs the stop of the clock generation circuit 558 according to the embodiment of the invention. As a result, the power consumption of the entire system comes to mainly depend on the leakage current. Accordingly, this very effectively works in a battery-powered portable device. If the internal RAM 552 is constituted with a DRAM, the memory control circuit 523 has to be kept in the self-refresh mode.

(STN7: Sleep Mode (Third Special Mode))

The sleep mode is the mode for stopping all the power sources of the CPU 510. The control of this mode is executed by a power MOS (not shown) connected in series with the power source. Transition to the sleep mode is executed, from the application side, by setting the internal register of the power down control circuit 556. Release from the sleep mode is carried out by using a hardwear signal to the power-down control circuit 556 which is the peripheral device not stopped yet. At that time, as the data stored in the internal DRAM and so on is era zed upon the stop of clocks, it would take a considerably long time for completely recovery the application.

It is possible to make transition from any one of ordinary operation modes to any one of special mode. The application program is able to make the ordinary operation mode transit to the special mode by calling the call function of an objective special mode as designated. Inversely, in order to return from the special mode to the ordinary operation mode, it is needed only to release the special mode because the setting of the register in the system control circuit 534 is kept unchanged. Release of the special mode is carried out usually by the external interruption which is controlled by means of the interruption control circuit 525 as shown in FIG. 1 or, if need be, by means of the external interruption control circuit 595 as shown in FIG. 2.

In FIG. 5, a plurality of parenthesized numerals appended to each of arrows transiting among various states (modes) indicate libraries corresponding to those state transitions. The above parenthesized numeral is referred to as "state transition number." The library will be explained later.

Figure 9:
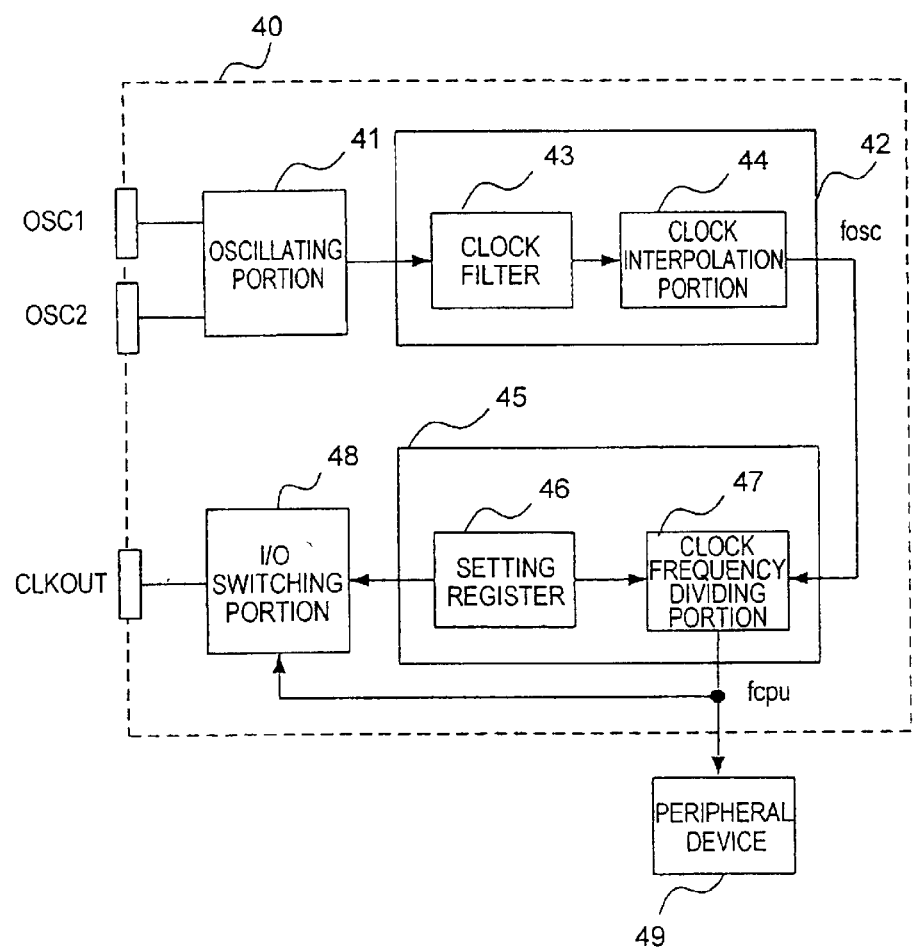
FIG. 9 is a block diagram for explaining a prior art clock control circuit.
Figure 10:
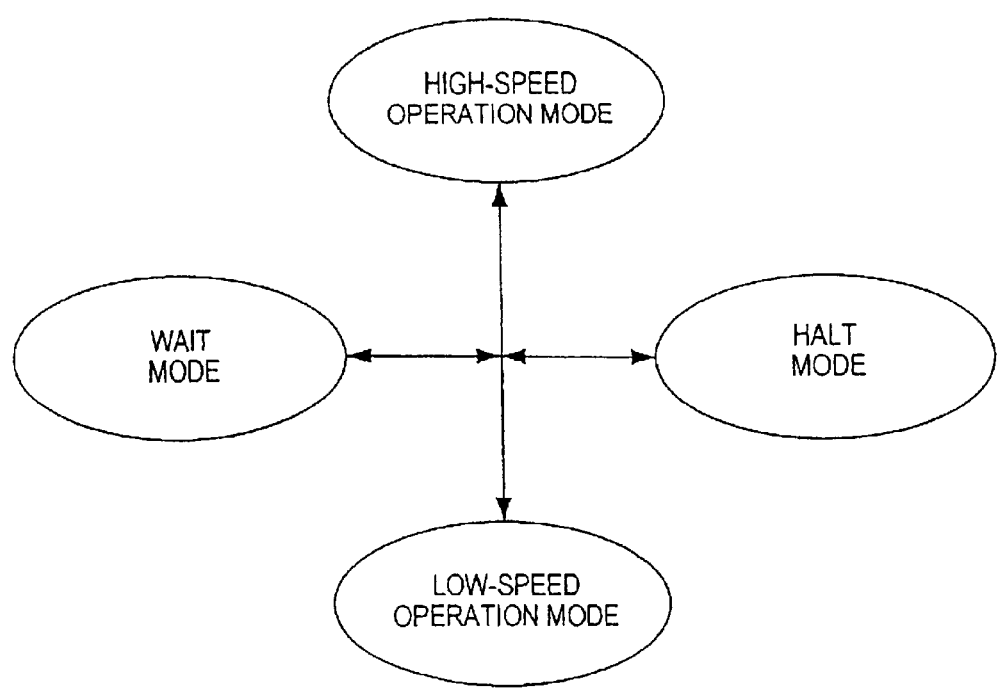
FIG. 10 is an illustration for explaining conventional clock operation modes.

Comparing the clock operation mode of the invention with the case of the ST7 core as shown in FIG. 9, it will be understood that the ST7 core divides the frequency of the clock from a single clock system and assigns the divided one to the low-speed operation mode while in the embodiment of the invention, the clock from the four clock systems can be put in a proper use. Especially, the output from the PLL 573 is added to one of choices as a new clock system. Furthermore, a substantial wait mode has been realized by using the frequency of 32.768 KHz generated by the quartz oscillator for use in the wristwatch as a base oscillation. This has been done for the purpose of the invention, which is to dynamically and quickly control the clock with a lot of frequencies covering the wide range of the operation modes from the high-speed operation mode to the low-speed operation mode based on the concept we call the clock gear.

The special mode of the clock operation is full of varieties. The invention further includes the sleep mode in addition to two modes, that is, the halt mode and the stop mode which are usually equipped, thereby freely control the reduction of the power consumption. Especially, it belongs to the characteristics of the invention that the transition from the ordinary operation mode to the special mode can be freely set from the side of the application program and also that the reverse transition can be executed with ease by means of the external interruption.

Further, in order to reduce the power consumption of the entire system without losing the versatility of the core CPU 512, there are provided in the CPU 510 the system control circuit 534 and the clock generation circuit 558 according to the invention. In this way, in the dynamic clock control according to the invention, the clock of the core CPU 512 in the system LSI 550 as well as the CPU 510 can be controlled simultaneously.

The control program group (referred to as a clock control library hereinafter) for embodying the concept of the above clock gear will be explained in the following.

Figure 6:
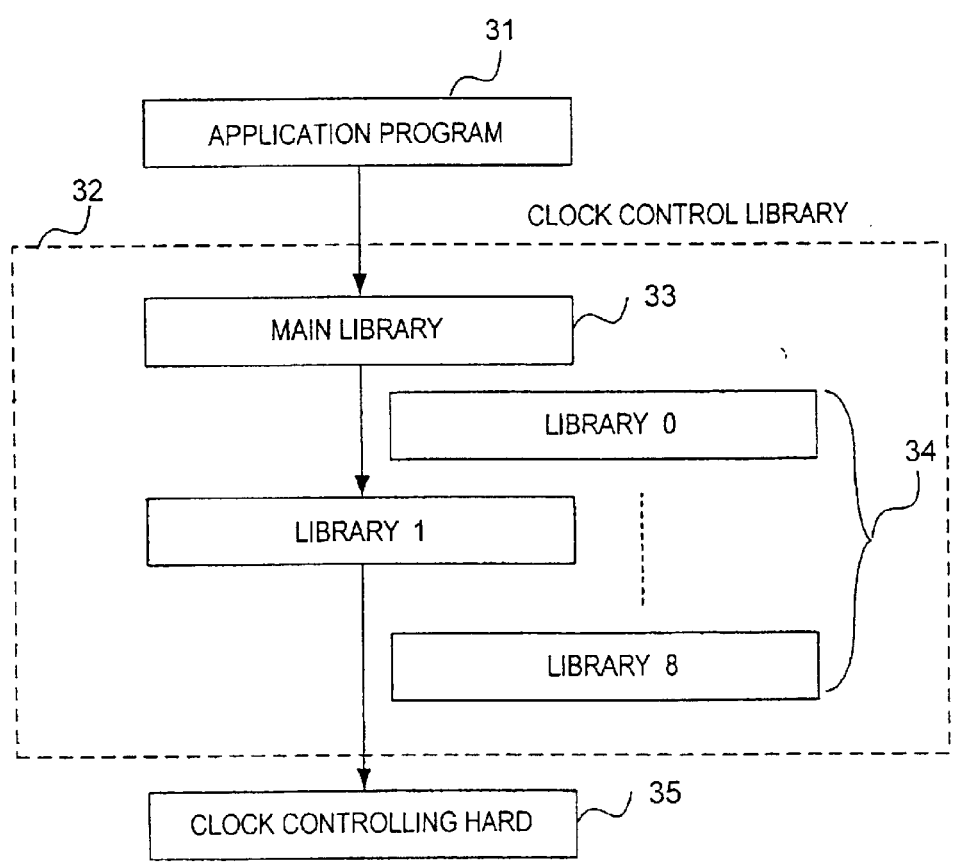
FIG. 6 is a block diagram for explaining the constitution of a clock control library.

The clock control library makes it possible to realize a real power management from the side of the application program by using the C language. FIG. 6 shows the structure of the clock control library 32 according to the embodiment of the invention.

When calling libraries 34 from an application program 31, the first thing to be done is to call a main library 33. This call is done by using the C language. The main library 33 is compiled also with the C language. The main library 33 selects either one of the libraries 34 in correspondence with the state of the application program 31 and achieves the transition between operation modes of the clock.

All the libraries 34 are compiled with the assembler language. This is because the clock control associated hardware has to be controlled directly. To put it concretely, the system control circuit 534 as shown in FIG. 3 and the clock generation circuit 558 as shown in FIG. 4 belong to the clock control associated hardware.

The operation of calling and selecting the library 34 by the main library 33 is carried out by involving the input parameter and others related thereto as shown in a table of FIG. 7. Furthermore, this figure shows a library function which is called in correspondence with the state transition of the clock, the input parameter and the jump table number. Still further, the jump table number indicates the relative address where the library 34 is located. The table also shows that a different library function is used depending on whether or not the DRAM is included in the system LSI and whether or not the lowest-speed operation mode is included as the clock mode.

A table as shown in FIG. 8 indicates what parameters each library has. With these parameters, the library executes the processing of setting the memory parameter, switching of the clock, switching the clock mode, and so forth. FIG. 8(*a*) indicates the library and the input parameter group as designated thereby. In each column ([1]) to ([8]) of the table, there are listed up the value of the input parameter.

In the next, the contents of each input parameter will be explained with reference to FIG. 8(*b*).

A memory parameter changing pattern [1] executes the change of the parameter setting in the memories (RAM, ROM, I/O, DRAM existing in the system LSI, and so forth) for operating them to meet the clock speed. For instance, when changing (gear up) from the lower-speed operation mode to the high-speed operation mode, the value 0×00 is designated, thereby the memory parameter being changed to the memory parameter for high-speed use. Inversely, when changing (gear down) from the high-speed operation mode to the low-speed operation mode, the value 0×01 is designated, thereby the memory parameter being changed to the memory parameter for low-speed use.

A CPU clock mode [2] designates the changeover between two operation modes, that is, the synchronous mode and the fast bus mode. The value 0×00 is designated in the fast bus mode while the value 0×01 is designated in the synchronous mode.

Continuing to explain other input parameters, an external ROM memory parameter [3] designates a ROM type. An external SRAM memory parameter [4] designates a SRAM type. An external I/O memory parameter [5] designates an I/O type. The value of SDRAM/EDO-RAM parameter [6] is made available in the range of 0×00 through 0×09 if the DRAM is SDRAM, and also made available in the range values of 0×00 through 0×0a if the DRAM is EDO-RAM. PCGBCNT0 SET VALUE [7] or PCGBCNT1 SET VALUE [8] determines a value to be set to the frequency division ratio setting register 563 as shown in FIG. 3, and designates the base oscillation, the clock frequency division ratio, and so forth. In all the parameters as mentioned above, there is no need for any input parameter to be set if its value is 0xff.

In FIG. 5, a plurality of parenthesized numerals appended to each of arrows transiting among various states (state transition number) indicate libraries corresponding to those state transitions. If the clock state transition is desired on the side of the application program s, just call the library corresponding to the state transition number by designating it, and the state transition will take place as desired.

The library function and the state transition number not always have a relation of one to one correspondence. One library function may realize a plurality of state transitions in response to the above-mentioned memory parameter change pattern. For instance, assuming that the application program 31 has carried out the control for switching the clock from the low-speed operation mode to the high-speed operation mode at the first line of the table as show in FIG. 8(b), the main library 33 calls the library 0, to put it concretely, calls the library function clkgear 9 to the relative address 0×00 by means of the input parameter 0×00.

At this time, if the current clock mode is the low-speed mode (STN3), the state transition number becomes (5) as shown in FIG. 5, and if the current clock mode is the high-speed mode (STN2), the state transition number becomes (3). Besides the clock control like the above, the library 33 is able to cope with various jobs such as halting PLL, setting the time, setting the frequency division ratio of an external circuit, and so forth.

As explained in the above, in the system LSI according to the invention, the main library 33 is prepared as an interface using the C language, so that the application program 31 is able to call, with case, an individual library 34 necessary for the clock transition under the control of the main library 33. Furthermore, all the libraries 34 are compiled in the assembler language, which is very suitable and helpful for the control of the system control circuit 534 as described above. The structure of the clock control library 32 as mentioned above makes it possible to realize the system LSI of the Low power consumption type with ease, which has been earnestly desired by a lot of users.

The system LSI according to the invention has been discussed so far by way of an exemplary example and with reference to the accompanying drawings, but the invention should not be limited to this example. It is apparent that one who is skilled in the art may make various variation or modification of the invention within the category of the technical thoughts as recited in the scope of claims for patent attached hereto. It is understood that such variation or modification naturally belongs to the technical scope of the invention.

The following are principal effects brought by the invention.

With a plurality of standard clock systems, it becomes possible to construct a system LSI having a variety of ordinary operation modes (highest-speed operation mode, high-speed operation mode, low-speed operation mode, lowest-speed operation mode, and so on).

Furthermore, when expressing the relation between the current clock state and the clock state after transition by using a function (clkgear) in the form of the clock control library, it becomes possible to dynamically and speedily control a plurality of clocks in the ordinary operation mode, as if it were gear-change operation. In this way, the clock state can be controlled more finely.

Still further, according to the invention, the system control circuit is provided with the register, and the control making the ordinary operation mode transit to the special mode is carried out by changing the value of this register. At this time, as the register setting is kept unchanged after completion of transition to the special mode, the transition from the special mode to the ordinary operation mode is carried out just releasing the special mode by means of the external interruption. Consequently, the transition control is made much easier.

Still further, according to the invention, the main library of the clock control library and the application program are described by using the same program language, and call of the main library from the side of the application program is carried out also by using the same program language. This makes it possible to realize such a flexible interface as handled by the user with ease, thus enabling the user to select the power management system which is the most suitable to his system.

What is claimed is:

1. A system LSI having a plurality of ordinary operation modes and a plurality of special modes in response to clock frequencies supplied to a central processing unit, comprising:

a first memory that stores a clock control library for controlling a clock frequency transition between said ordinary operation modes;

a system control circuit which has a register, wherein said system control circuit carries out the clock frequency transition between said ordinary operation modes and said special modes in response to a change of a value in said register, and also carries out the clock frequency transition among said ordinary operation modes in response to said clock control library;

a clock generation circuit that receives a plurality of standard clocks, wherein said clock generation circuit generates a clock supplied to said central processing unit according to control by said system control circuit; and a second memory that stores an application program, wherein calling of said clock control library and changing of said register value are programmably controlled by said application program to enable user selectable clock frequency transitions, wherein said special modes comprise a first special mode in which clock supply to principal constituents of said central processing unit is halted, a second special mode in which clock supply to an entirety of said central processing unit is halted, and a third special mode in which supply of power to the entirety of said central processing unit is halted.

2. A system LSI as claimed in claim 1, wherein said clock control library comprises:

a plurality of libraries that control said system control circuit and said clock generation circuit to transition the clock frequencies supplied to said central processing unit; and a main library which is called by said application program and selects any one of said libraries in correspondence with the clock frequency supplied to said central processing unit.

3. A system LSI as claimed in claim 2, wherein said main library is described using a same program language as said application program.

4. A system LSI as claimed in claim 3, wherein said application program and said main library are described using C language.

5. A system LSI as claimed in claim 2, wherein each of said libraries is described using a program language capable of directly controlling said clock generation circuit and said system control circuit.

6. A system LSI as claimed in claim 5, wherein each of said libraries is described using an assembler language.

7. A system LSI as claimed in claim 1, wherein said system control circuit comprises:

a frequency division ratio setting register that sets a frequency division ratio of the clock generated by said clock generation circuit;

a clock halting register that receives the clock from said clock generation circuit and individually sets the clock to be halted or supplied; and a status register that judges a state of said central processing unit immediately after being released from said third special mode.

8. A system LSI as claimed in claim 1, wherein said clock generation circuit comprises:

a PLL that receives a plurality of standard clocks and generates the clock if needed by multiplying said standard clocks; and a frequency division/selection portion that carries out frequency division or selection of said standard clocks or said multiplied standard clock.

9. A system LSI as claimed in claim 8, wherein one of said standard clocks uses a frequency of 32.768 kHz as a base oscillation.

10. A system LSI as claimed in claim 1, wherein said first memory and said second memory are two independent memories which are separated from each other.

11. A system LSI as claimed in claim 1, wherein said first memory and said second memory are formed to coexist in one memory, sharing memory area of said one memory.

* * * * *